United States Patent

Pan et al.

[11] Patent Number: 5,961,579
[45] Date of Patent: *Oct. 5, 1999

[54] APPARATUS USING A LOGARITHM BASED PROCESSOR

[75] Inventors: ShaoWei Pan, Lake Zurich; Shay-Ping T. Wang, Long Grove, both of Ill.; Bernard E. Sigmon, Gilbert; Stephen Chih-Hung Ma, Mesa, both of Ariz.; Kevin M. Laird, Keller, Tex.; Jeffrey G. Toler, Algonquin, Ill.

[73] Assignee: Motorola, Inc., Schaumburg, Ill.

[*] Notice: This patent is subject to a terminal disclaimer.

[21] Appl. No.: 08/838,253

[22] Filed: Apr. 17, 1997

[51] Int. Cl.[6] .............................. G06F 7/00; H04L 25/49
[52] U.S. Cl. ............................ 708/517; 375/296
[58] Field of Search ................. 364/715.03, 722, 364/724.011, 748.18, 748.5; 375/296, 297

[56] References Cited

U.S. PATENT DOCUMENTS

| 3,610,901 | 10/1971 | Lynch | 364/724.011 |
|---|---|---|---|
| 4,682,302 | 7/1987 | Williams | 364/768 |
| 4,720,809 | 1/1988 | Taylor | 364/748.18 |
| 5,374,896 | 12/1994 | Sato et al. | 330/149 |
| 5,570,063 | 10/1996 | Eisenberg | 330/149 |
| 5,589,796 | 12/1996 | Alberth, Jr. et al. | 330/133 |

*Primary Examiner*—Chuong Dinh Ngo
*Attorney, Agent, or Firm*—James E. Gauger

[57] ABSTRACT

An apparatus that includes a logarithm based processor (216) having at least one digital logarithm converter (202) and a power amplifier (208) responsive to the logarithm based processor (216).

21 Claims, 3 Drawing Sheets

APPARATUS USING A LOGARITHM BASED PROCESSOR

CROSS REFERENCES

The present application is related to patent application Ser. No. 08/382,467, filed Jan. 31, 1995. The present application is related to a copending application filed on the same date as the present application entitled "Apparatus for Amplifying a signal using a Digital Processor", by Pan et al., attorney docket number MNE00464N. The entire contents, including claims, specification, and drawings, of the above applications are incorporated by reference herein.

FIELD OF THE INVENTION

The present invention relates to apparatus that use a logarithm based processor.

BACKGROUND OF THE INVENTION

Many existing systems and apparatus use conventional digital processing devices to perform a wide variety of functions. For example, in communications applications, microprocessors are found in almost every available device, such as in cellular telephones, two-way radios, base stations, receivers, modems, satellites, telephone switches, and wireless transmission systems. In all of these applications, as processor speeds increase and memory becomes less expensive, new products incorporating faster processors using more memory are continually developed. Thus, a premium is placed on devices using the latest technology with the fastest processors using low power with reduced size and cost.

Accordingly, there is a need for improved apparatus for a variety of commercial applications, including communication applications, where the improved apparatus uses a low power, low cost processor with greatly increased processing speed.

BRIEF DESCRIPTION OF THE DRAWINGS

The invention is pointed out with particularity in the appended claims. However, other features of the invention may become more apparent and the invention may be better understood by referring to the following detailed description in conjunction with the accompanying drawings.

Brief Description of the Drawings

Figure 1:
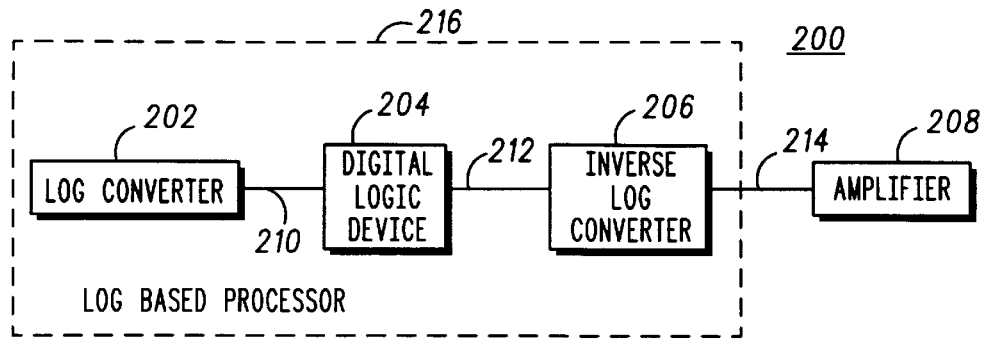

FIG. 1 is a block diagram of an embodiment of an apparatus in accordance with the present invention.

Figure 2:
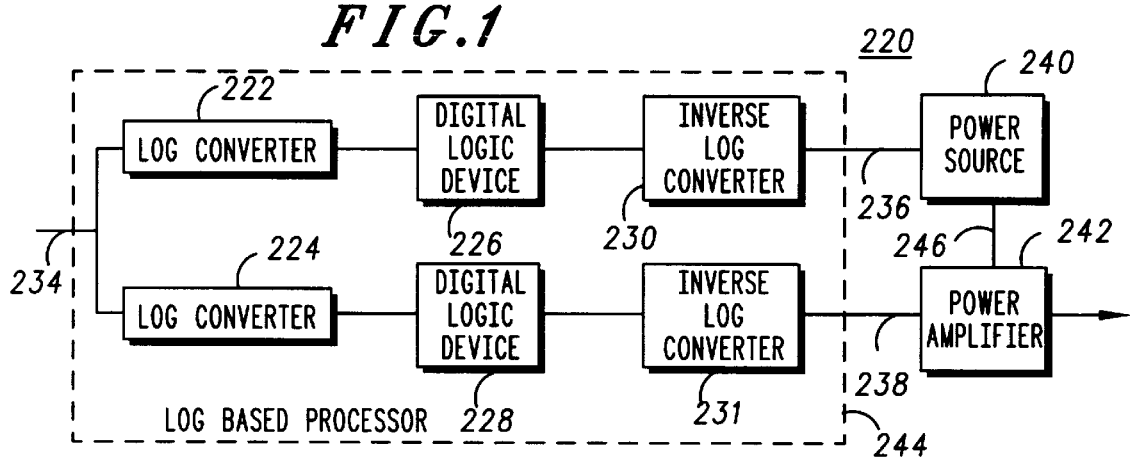

FIG. 2 is a block diagram of another embodiment of an apparatus in accordance with the present invention.

Figure 3:
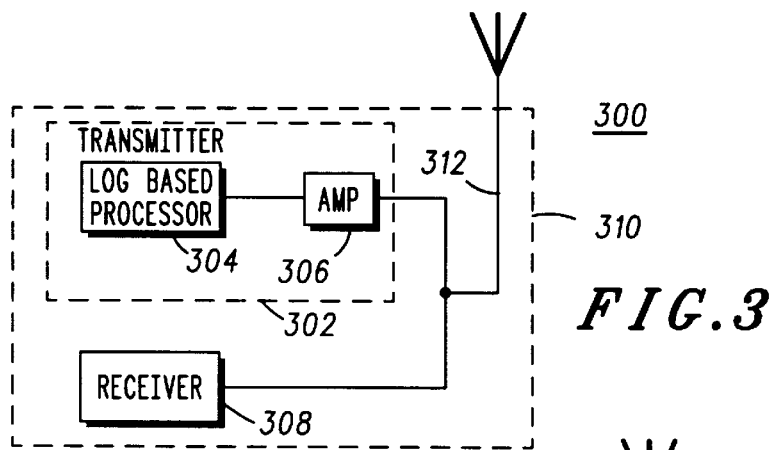

FIG. 3 is a block diagram of an embodiment of a communication device in accordance with the present invention.

Figure 4:
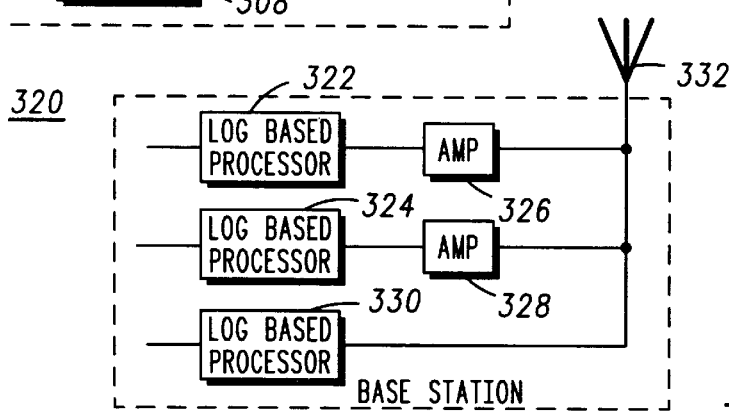

FIG. 4 is a block diagram of an embodiment of a base station in accordance with the present invention.

Figure 5:
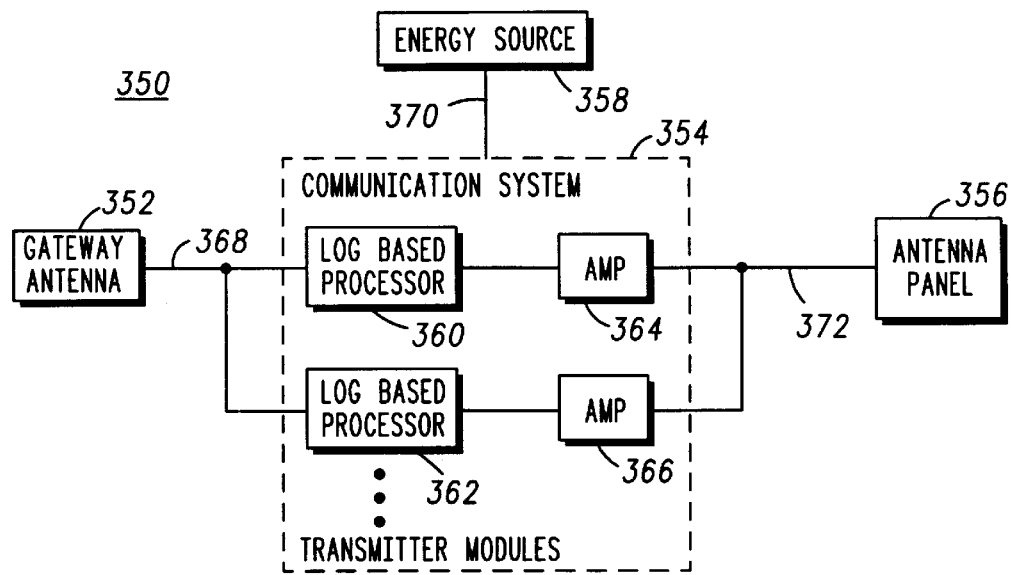

FIG. 5 is a block diagram of an embodiment of a satellite in accordance with the present invention.

Figure 6:
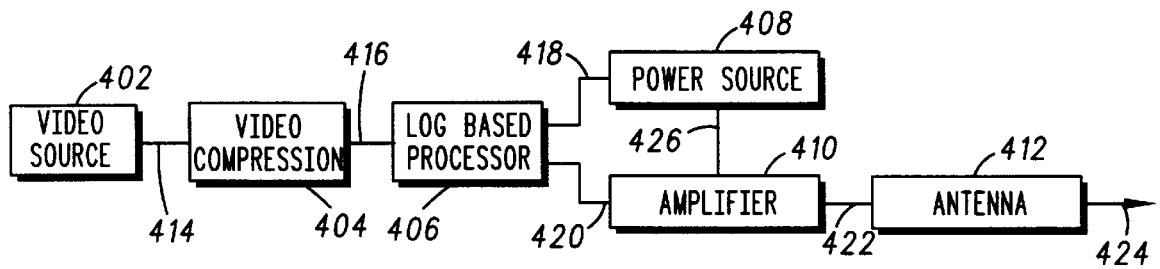

FIG. 6 is a block diagram of an embodiment of a television transmitter in accordance with the present invention.

Figure 7:
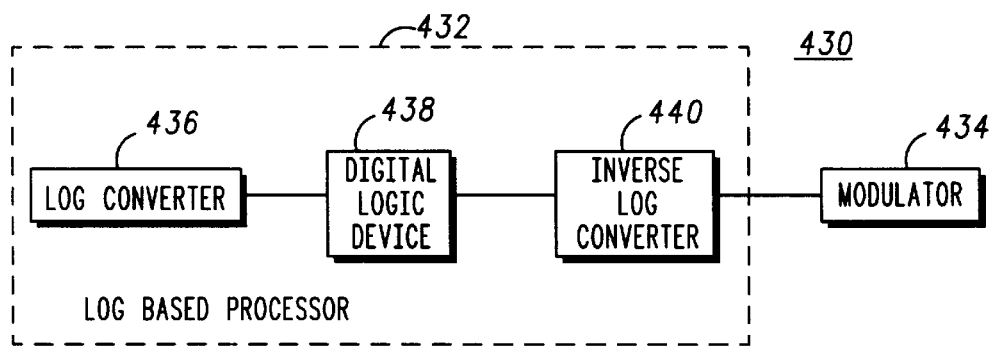

FIG. 7 is a block diagram of another embodiment of the present invention.

Figure 8:
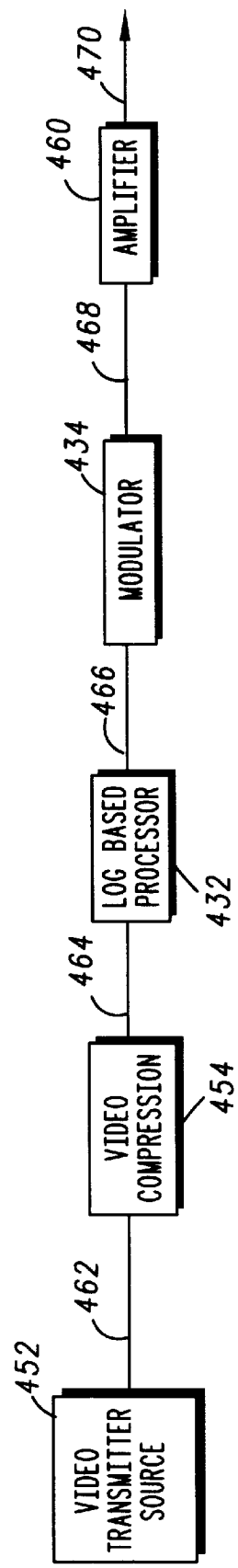

FIG. 8 is a block diagram of another embodiment of a television transmitter in accordance with the present invention.

DETAILED DESCRIPTION OF THE PREFERRED EMBODIMENT(S)

In order to address the above described need, the present invention provides various types of apparatus using a logarithm based processor. Due to the increased processing speed and other advantages of the logarithm based processor, apparatus using a logarithm based processor can provide greater performance in a wide variety of applications.

In accordance with a first embodiment of the present invention, the apparatus includes a logarithm based processor having at least one digital logarithm converter and a power amplifier responsive to the logarithm based processor. In this embodiment, the power amplifier driven by the logarithm based processor provides increased power efficiency.

In accordance with another embodiment, the apparatus is a base station for use in a wireless communication system. The base station includes a first logarithm based processing device, a second logarithm based processing device, an amplifier, and an antenna. The first and the second logarithm based processing devices each include at least one digital logarithm converter. The amplifier is responsive to at least one of the logarithm based processing devices, and the antenna is responsive to the amplifier.

In accordance with another embodiment, the apparatus is a satellite system. The satellite system includes a first logarithm based processing device, a second logarithm based processing device, an amplifier, and an antenna. The first and the second logarithm based processing devices each include at least one digital logarithm converter. The amplifier is responsive to at least one of the logarithm based processing devices, and the antenna is responsive to the amplifier.

In accordance with another embodiment, the apparatus is a digital signal processing device. The digital signal processor includes a digital logarithm converter, a digital logic unit responsive to the digital logarithm converter, and a digital antilogarithm converter responsive to the digital logic unit. The digital logic unit includes a register and a summer.

In accordance with another embodiment, the apparatus is a digital television signal transmitter. The digital television signal transmitter includes a logarithm based processor including at least one logarithm converter and a modulator responsive to the logarithm based processor.

Referring to FIG. 1, an embodiment of an apparatus 200 is illustrated. The apparatus 200 includes a logarithm based processor 216 and an amplifier 208. The logarithm based processor 216 is connected to the amplifier 208 by a communication link 214. In the preferred embodiment, the communication link 214 may be either a single electrically conductive connection, such as a copper wire, or may be a plurality of different electrically conductive connections. The logarithm based processor 216 includes a logarithm converter 202, a digital logic device 204, and an inverse logarithm converter 206. The digital logic device 204 is coupled to the logarithm converter 202 via a first digital connection 210 and is coupled to the inverse logarithm converter 206 via a second digital connection 212. The digital logic device 204 may be any known digital logic device, such as a register, a shifting device, a summer, a multiplexor, an and gate, an or gate, an exclusive or gate, an exclusive and gate, an inverter, a flip flop, a counter, arithmetic logic units, or any other digital circuit. The logarithm converter 202 and the inverse logarithm converter 206 may be any logarithm converter and inverse logarithm converter having good computation accuracy and high speed. An example of such devices may be found in patent application Ser. No. 08/382,467, filed Jan. 31, 1995.

The apparatus 200 may be beneficially used in a large number of applications by appropriately programming the logarithm based processor 216 to control the amplifier 208. For example, the logarithm based processor 216 may be programmed to provide a predistortion signal over communication link 214 to the amplifier 208. Since the logarithm based processor 216 is a high speed digital processor suitable for computing polynomial equations, the predistortion signal may be determined quickly enough to efficiently control the amplifier 208. In the preferred embodiment, the predistortion signal is approximated using a polynomial function, such as a nonlinear polynomial function of the form $aX^i+bX+c$, where a, b, c are coefficients, X is an input variable, such as current or voltage, and i is an exponential. The logarithm based processor 216 calculates certain terms in a polynomial equation, such as the term $X^i$, very quickly since a combination of low complexity high speed shifting and adding operations performed by the digital logic device 204 may be used instead of complex low speed floating point multiplications. Although only a single exponential term and a single variable, X, was used for illustrated purposed, it is contemplated that the logarithm based processor 216 may calculate polynomials with a plurality of exponential terms and a plurality of variables.

Referring to FIG. 2, another embodiment of an apparatus 220 in accordance with the present invention is illustrated. In this embodiment, the apparatus 220 includes a logarithm based processor 244, a power source 240, and a power amplifier 242. The logarithm based processor 244 includes a plurality of logarithm converters, such as first logarithm converter 222 and second logarithm converter 224. The logarithm based processor 244 further includes a plurality of digital logic units, such as first digital logic unit 226 and second digital logic unit 228, and a plurality of inverse logarithm converters, such as first inverse log converter 230 and second inverse log converter 232. The first and second logarithm converters 222, 224, each receive an input signal from input 234. After processing the input signal within log converter 222, and digital logic device 226, the inverse log converter 230 produces a first output signal 236. The second inverse logarithm converter 232 produces a second output signal 238. The first output signal 236 drives the power source 240, which in turn produces a power signal 246 that is fed to power amplifier 242. The second output signal 238 drives an input of the power amplifier 242. By having a plurality of logarithm converters, digital logic devices, and inverse logarithm converters, the logarithm based processor 244 can control a plurality of electronic devices, such as the power source 240 and the power amplifier 242.

Referring to FIG. 3, an embodiment of a communication device 300 is illustrated. The communication device 300 includes conventional components such as a housing 310, an antenna 312, and a receiver 308. However, the communication device 300 is improved by using a transmitter 302 that has at least one logarithm based processor 304 and amplifier 306. It is contemplated that the communication device 300 may be used in a wide variety of communication applications, such as a cellular or PCS type telephone, a hand-held communicator in a satellite communication system, such as the IRIDIUM® satellite network system, a two-way radio, such as an emergency police or fire radio or a radio used in trunked radio or dispatch systems, or in any other portable device using a transmitter, including without limitation a two-way pager. The transmitter 302 may include either the apparatus 200 of FIG. 1 using a single logarithm converter, or the apparatus 220 of FIG. 2, using a plurality of logarithm converters. In a particularly preferred embodiment, the transmitter 302 is constructed using embodiments of the power amplifier described in copending patent application entitled "Apparatus for Amplifying a signal using a Digital Processor", by Pan et al., attorney docket number MNE00464N.

Referring to FIG. 4, an embodiment of a base station 320 in accordance with the present invention is illustrated. The base station 320 includes a plurality of logarithm based processors, including first logarithm based processor 322 and second logarithm based processor 324, and a plurality of amplifiers, such as first amplifier 326 and second amplifier 328. The base station 320 further includes an antenna 332 and a receiver 330. The first logarithm based processor 322 and the first amplifier 326 together are part of a first transmitter module, such as a radio frequency transmitter module. Similarly, the second logarithm based processor 324 and the second amplifier 328 form a second transmitter module. The first and second transmitter modules may be implemented using any apparatus described with respect to FIGS. 1 and 2. The base station 320 may be used in a wide variety of communication applications, such as cellular or PCS terrestrial base station, ground station in a satellite communication system, fixed unit in a trunked radio or dispatch radio system, or any other communication system having a plurality of transmitters to transmit a plurality of signals. Further details of such communication systems may be found in appropriate communications standards documents, such as Interim Standard (IS) IS-54, Group Special Mobile (GSM) cellular systems, and IS-95 for code division multiple access (CDMA) systems.

Referring to FIG. 5, an embodiment of a satellite system 350 in accordance with the present invention is illustrated. The satellite system 350 includes a gateway antenna 352, an energy source 358, a communication subsystem 354, and an antenna panel 356. The energy source 358 is preferably a power source suitable for use in satellites, such as a battery connected to solar panels. The gateway antenna 352 is preferably an antenna array suitable for use in a satellite. The communication system 354 receives an input signal 368 from the gateway antenna 352 and produces an output signal 372 which is fed to the antenna panel 356. The communication system 354 further receives a power input 370 from the energy source 358. In the preferred embodiment, the communication system 354 includes a plurality of transmitter modules that each include a logarithm based processor, such as logarithm based processors 360, 362 and an amplifier, such as amplifiers 364, 366. The logarithm based processors 364 and 366 and the amplifiers 364 and 366 may be implemented using the apparatus described with respect to FIGS. 1 or 2. By using a logarithm based processor, the amplifiers operate at higher power delivery efficiencies. As a result, the energy source 358 does not need to provide as much power and may therefore be size and weight reduced. Reducing the size and weight of an energy source in a satellite greatly reduces the overall payload of the satellite and thereby greatly reduces the cost of the entire satellite system.

Referring to FIG. 6, a video transmitter 400 in accordance with the present invention is illustrated. The transmitter 400 includes a video source 402, a video compression unit 404, a logarithm based processor 406, a power source 408, an amplifier 410, and an antenna 412. The video source 402 and the video compression unit 404 are conventional devices known to those of skill in the art.

During operation, the video source 402 provides a wideband, such as 30 MHz, video signal 414 which is compressed by video compressor 404 into a narrowband video signal 416, such as a 6 MHz video signal. The narrowband video signal 416 is then processed by the logarithm based processor 406 to produce a first signal 418, such as a pulse width modulated signal, and a second signal 420, such as a frequency modulated signal. The power source 408, in response to the first signal 418, produces a power delivery signal 426 to the amplifier 410. The amplifier 410, in response to the second signal 420 and the power delivery signal 426 produces an amplified video signal 422, which is then irradiated by antenna 412 and broadcast over communication media 424. In the preferred embodiment, the transmitter 400 is a component of a high definition television (HDTV) type of system.

In reference to FIG. 7, another embodiment of the present invention is illustrated. In this embodiment, a signal processing apparatus 430 includes a logarithm based processor 432 and a modulator 434. As with other embodiments disclosed herein, the logarithm based processor 432 includes a logarithm converter 436, digital logic 438, and an inverse logarithm converter 440. The modulator 434 is preferably a digital modulator, such as a digital frequency modulation unit suitable for use in frequency upconverting radio frequency signals.

Referring to FIG. 8, a particular application for the apparatus 430 of FIG. 7 is illustrated. In this embodiment, a video transmitter 450 using the apparatus 430 is disclosed. The video transmitter 450 includes a video source 452, a video compression module 454, a logarithm based processor 432, a modulator 434, and an amplifier 460. The video transmitter 452 produces a video signal 462, which is compressed by video compression module 454 into compressed signal 464. The digital logarithm based processor 432 processes the compressed signal 464 to produce processed signal 466 which is fed to modulator 434. Modulator 434 produces a modulated and processed signal 468 which is amplified by amplifier 460 and then broadcast over communication medium 470. Although the logarithm processor 432 may perform a wide variety of useful functions to enhance the compressed signal 464, a particular example will be described for illustrative purposed.

In this example configuration, the logarithm based processor 432 is designed to predistort the compressed signal 464 and the output signal 466 is a predistorted signal. The predistortion is calculated by the logarithm based processor 432 by calculating a polynomial function that is an estimate of the inverse of the distortion produced by the amplifier 460.

The logarithm based processor 432 may be programmed to calculate in real time predistorted signal 466 in accordance with a suitable polynomial equation. In this manner, the modulated signal 468 fed into the amplifier 460 is a predistorted signal to correct for distortion inherent within the amplifier 460. The resulting output broadcast signal 470 has reduced distortion and thereby causes less interference with neighboring spectrum. Reduced distortion broadcast signals from a television transmitter in accordance with the present invention may advantageously provide a broadcast signal that is transmitted using spectrum that is currently not usable, e.g. between two standard television broadcast frequencies in urban television markets.

A detailed example of a power amplifier apparatus using a logarithm based processor determining a predistortion signal based on a polynomial equation is illustrated in the copending patent application "Apparatus for Amplifying a signal using a Digital Processor", by Pan et al., attorney docket number MNE00464N, the entire content of which has been incorporated by reference herein.

Thus, there has been disclosed various improved apparatus suitable for use in a wide variety of commercial applications, including communication applications, where the improved apparatus uses a low power, low cost logarithm based processor with greatly increased processing speed.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An apparatus using a logarithm based processor, the apparatus comprising:

a logarithm based processor having at least one digital logarithm converter, the logarithm based processor configured to estimate a predistortion signal using a nonlinear polynomial having a plurality of exponential terms, the logarithm based processor having an output; and a power amplifier having an input coupled to the output of the logarithm based processor, wherein the predistortion signal estimated by the logarithm based processor is an inverse of distortion produced by the power amplifier when the power amplifier amplifies a signal.

2. The apparatus of claim 1, wherein the logarithm based processor further comprises an antilogarithm converter.

3. The apparatus of claim 1, wherein the logarithm based processor further comprises a digital logic circuit responsive to the digital logarithm converter.

4. The apparatus of claim 3, wherein the digital logic circuit comprises one of a summer, a register, and a multiplexor.

5. The apparatus of claim 1, wherein the logarithm based processor includes a plurality of logarithm converters.

6. The apparatus of claim 1, further comprising an antenna responsive to the power amplifier.

7. The apparatus of claim 6, further comprising a plurality of logarithm based processors.

8. The apparatus of claim 6, further comprising a receiver responsive to the antenna.

9. The apparatus of claim 8, wherein the antenna, logarithm based processor, amplifier, and receiver are disposed in a portable housing.

10. The apparatus of claim 6, wherein the antenna is a radio frequency transmission antenna.

11. A base station for use in a wireless communication system, the base station comprising:

a first logarithm based processing device including at least one digital logarithm converter, the first logarithm based processing device configured to estimate a first predistortion signal using a nonlinear polynomial having a plurality of exponential terms, the first logarithm based processing device having a first output;

a second logarithm based processing device including at least one digital logarithm converter; the second logarithm based processing device configured to estimate a second predistortion signal using a nonlinear polynomial having a plurality of exponential terms, the second logarithm based processing device having a second output;

an amplifier having an input coupled to at least one of the first output of the first logarithm based processing device and the second output of the second logaritm based processing device, wherein at least one of the first predistortion signal estimated by the first logarithm based processing device and the second predistortion signal estimated by the second logarithm based processing device at least partially cancels distortion produced by the amplifier when a signal is applied thereto; and an antenna responsive to the amplifier.

12. The base station of claim 11, wherein the first logarithm based processing device includes an inverse logarithm converter.

13. The base station of claim 11, wherein the first logarithm based processing device includes a digital logic device responsive to the logarithm converter.

14. The base station of claim 13, wherein the digital logic device is selected from the group consisting of a shifter, a summer, a register, a memory, and a multiplexor.

15. A satellite system comprising:

a first logarithm based processing device including at least one digital logarithm converter the first logarithm based processing device configured to estimate a first predistortion signal using a nonlinear polynomial having a plurality of exponential terms, the first logarithm based processing device having a first output;

a second logarithm based processing device including at least one digital logarithm converter the second logarithm based processing device configured to estimate a second predistortion signal using a nonlinear polynomial having a plurality of exponential terms, the second logarithm based processing device having a second output;

an amplifier to receive an input signal and to provide an amplified signal, the amplifier having an input coupled to at least one of the first output of the first logarithm based processing device and the second output of the second logaritm based processing device, wherein at least one of the first predistortion signal estimated by the first logarithm based processing device and the second predistortion signal estimated by the second logarithm based processing device at least partially cancels distortion produced by the amplifier when the input signal is amplfied by the amplifier to produce the amplified signal; and an antenna responsive to the amplifier to transmit the amplified signal.

16. The sastellite system of claim 15, wherein at least one of the first and second logarithm based processing devices includes a digital inverse logarithm converter.

17. A communication device comprising:

a housing;

a transmitter disposed within the housing, the transmitter including a logarithm based processor having at least one digital inverse logarithm converter; and an amplifier configured to amplify a signal having a predistortion component produced by the logarithm based processor, the predistortion component represented by a nonlinear polynomial function.

18. The communication device of claim 17, further comprising an amplifier responsive to the logarithm based processor.

19. The communication device of claim 17, further comprising an antenna operatively coupled to the transmitter and wherein the nonlinear polynomial function has a plurality of exponential terms.

20. The communication device of claim 19, further comprising a receiver disposed within the housing.

21. The communication device of claim 20, wherein the communication device is selected from the group consisting of a hand-held radio, a cellular phone, a base station, a hand-held communicator in a satellite communication system, a satellite, and a pager.

* * * * *